Nov. 13, 1934.  C. W. GANNETT  1,980,479
WHEEL
Filed March 25, 1932   2 Sheets-Sheet 1
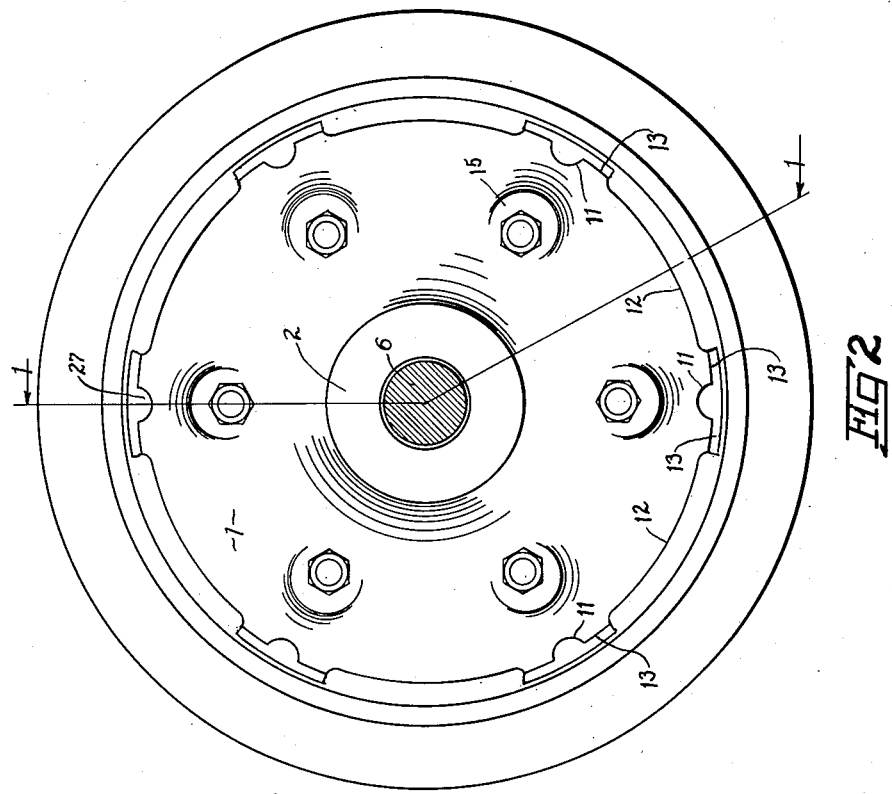
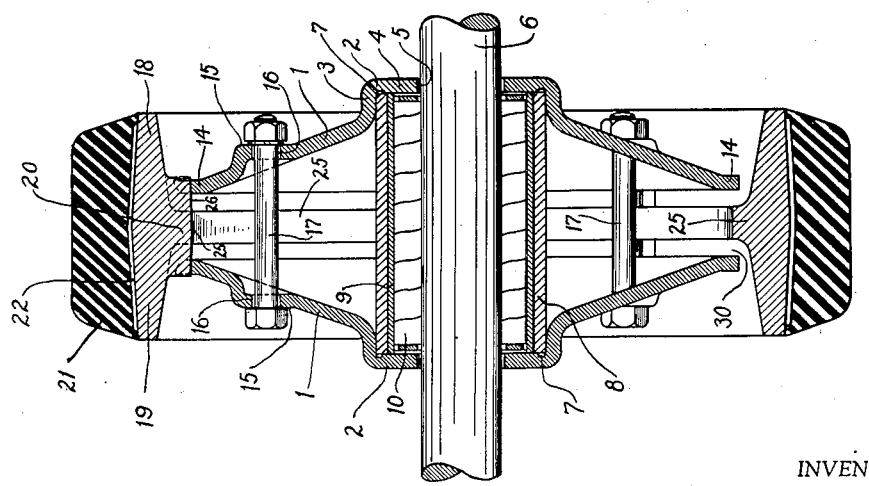
INVENTOR.
Chauncey W. Gannett.
BY
Slough and Canfield
ATTORNEY.

Nov. 13, 1934.  C. W. GANNETT  1,980,479
WHEEL
Filed March 25, 1932  2 Sheets-Sheet 2
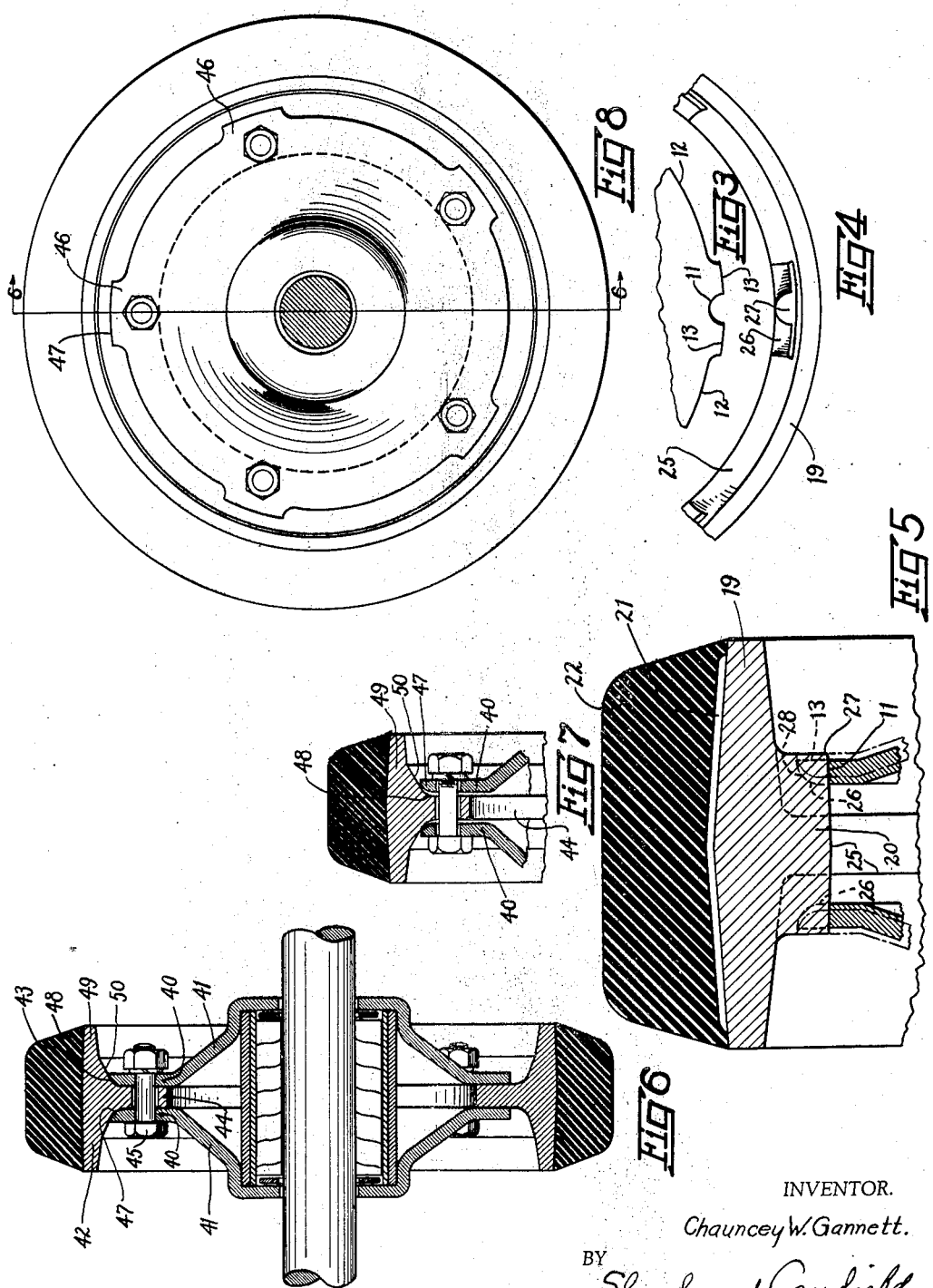
INVENTOR.
Chauncey W. Gannett.
BY
Slough and Canfield
ATTORNEY.

Patented Nov. 13, 1934

1,980,479

UNITED STATES PATENT OFFICE 1,980,479

WHEEL

Chauncey W. Gannett, Wellington, Ohio, assignor to The Wellington Machine Company, Wellington, Ohio, an organization of Ohio Application March 25, 1932, Serial No. 601,245

6 Claims. (Cl. 301—63)

This invention relates to wheels and particularly to wheels adapted for use upon wheelbarrows, trucks or the like.

In some aspects of my invention it relates more particularly to wheels of the disc type.

It is an object of my invention to provide in a wheel of the disc type, an improved construction for effecting a juncture between the wheel disc and the wheel rim.

Another object is to provide such a joint structure wherein the disc may have a wedging engagement with the rim to facilitate the assembly of the wheel and rim and render the assembly permanent and to provide therein the maximum of strength for the minimum of material.

Another object of my invention is to provide a strong and durable wheel which can be made at a moderate price due to the labor saving method of manufacture employed, and at the same time which wheel will be accurate and serviceable for the purposes intended.

Another object of my invention is to provide an improved form of disc which may be employed as the central disc of a disc type wheel.

Another object of my invention is to provide an improved wheel rim for wheels generally of the disc type.

Other objects will be apparent to those skilled in the art to which my invention appertains.

My invention is fully disclosed in the following description taken in connection with the accompanying drawings in which Fig. 1 is a cross sectional view of a wheel constructed in accordance with and embodying my invention;

Fig. 2 is a side elevational view of the wheel of Fig. 1;

Figs. 3 and 4 are respectively fragmentary views illustrating separately, portions of a wheel disc and a wheel rim which I may employ in the embodiment of my invention of Figs. 1 and 2;

Fig. 5 is a fragmentary view to an enlarged scale of a part of Fig. 1 and illustrating some of the parts in the positions which they take up during the assembly of the wheel;

Fig. 6 is a view similar to Fig. 1 illustrating a modification;

Fig. 7 is a fragmentary view of a part of Fig. 6 illustrating parts thereof in the position which they assume when the wheel is being assembled;

And Fig. 8 is an elevational view of the wheel of Fig. 6;

Referring to the drawings, I have shown at 1—1 a pair of sheet metal discs, press-formed at their central portions to provide cup like portions 2 comprising each a cup skirt 3 and bottom 4. The cup bottom 4 is perforated as at 5 with a central perforation of such size as to slightly clear a wheel shaft 6. Interiorly, the cup portions 2 in the annular corners thereof are relieved by grooves 7. A tubular hub element 8 having its ends in a plane at right angles to the axis has each end seated in a cup form portion 2, being fitted telescopically within the skirt portion 3 of the cup and abutting upon the bottom 4, the groove 7 permitting the ends of the hub element to bottom when the sheet metal from which the discs are made is relatively thick and therefore cannot be formed or bent on a very small corner radius.

Within the hub element 8 is telescopically supported the outer race element 9 of a roller bearing, the rollers 10 being disposed between the race element and the shaft 6.

The discs 1 are generally dish shaped with their concave sides confronting each other in the assembled wheel as in Fig. 1, and thus in cross section, the discs incline inwardly axially and outwardly radially. The outer peripheries of the discs 1 are not continuously circular but have the peripheral configuration shown in Figs. 2, 3 and 4. At spaced intervals along the periphery, there are provided semi-circular notches 11—11 and, between the notches, circumferentially elongated recesses 12—12. Between the notches 11 and the end terminations of the recesses 12 there are thus left circular peripheral portions 13—13.

The peripheral portion of the disc generally is bent or pressed or otherwise formed to lie in a plane at right angles to the axis and thus there is provided as at 14 a planar portion and it is in this portion that the notches 11, recesses 12 and circular portion 13 are disposed.

Between the periphery of the discs and their centers, the material is pressed outwardly axially at a circular series of equidistant points to provide a plurality such as 6 surface portions 15 in planes substantially at a right angle to the axis. And the disc material is perforated substantially at the centers of the said surfaces as at 16. Bolts 17—17 are projected through the perforations 16 of opposite plates 1 and the parallel surfaces 15 thus form suitable reaction bases for the heads and nuts of the bolts whereby the plates 1—1 may be forcibly drawn toward each other to clamp the hub elements within the cup 2—2 and to clamp the peripheries of the discs upon the rim shown generally at 18 which will now be described.

As shown in Fig. 1, the rim 18 comprises a generally annular felly portion 19 and an inwardly extending annular disc engaging portion 20. The felly portion 19 is generally in the form of a band and has on its outer face a plurality of transverse ribs 21, and a solid rubber tire 22 is fitted over the felly and engaged by the ribs 21 to hold it securely in place. If desired, the tire may be vulcanized on the rim permanently.

Referring to Figs. 1 to 5, the rim comprises an inwardly radially extending rib 25; and the rib is axially thickened at equally spaced points therearound to provide bases 26—26 upon which the peripheral portion 13—13 of the discs may rest. And upon each base 26 is a tongue portion 27 adapted to enter the semi-circular notch 11 of the disc when resting upon the base.

As shown in Figs. 1 and 5, the peripheral portion 13 which rests upon the bases 26 is rounded to provide the generally outwardly flaring surface 28 and the material of the base 26 is formed to conform to the surface 28.

When the bolts 17 are drawn up tight, the peripheral portions 13 above described are firmly pressed upon the seat 26. And due to the outwardly flaring surface 28 and the conforming surface of the base 26, the peripheral portions 13 upon being forcibly moved to their seats on the bases 26, may exert an outwardly wedging action upon the rim 18. Thus the rim and the discs 1—1 are rigidly secured together by the outward radial thrust on the discs on the rim and this thrust may be predetermined in amount by making the peripheral portion 13 slightly oversize in diameter.

By forming the discs 1 from relatively thick material, the bolts 17 may be relied upon to hold both the hub and the rim in assembled relation with the discs without unduly bending the discs.

By engaging the wheel rim with the discs at these points, such as six points as illustrated, the discs and rims may be made to rigidly lock with each other as described without the necessity of refined operations in the manufacture of the parts.

Also, by providing the recesses 12, there will be openings such as that illustrated at 30 Fig. 1 between the discs and the rim at those portions between the disc supporting bases 26 whereby water or other deleterious material which may work its way between the discs may have an outlet.

By means of the projection 27 entering the notches 11, the perforations 16—16 of the discs are automatically aligned for reception of the bolts 17; and the discs 1 and rim 18 are interlocked together; and the above described wedging action of the outwardly flaring portions 28 of the discs upon the corresponding portions of the bases 26 is caused to occur predeterminedly on suitable portions of the discs and rim circumferentially.

In the form of my invention shown in Figs. 6, 7 and 8, above described planar portion 14 of the discs 1 of Fig. 1 are replaced by planar portions 40 of greater radial extent and the disc body portions proper, 41, are inclined inwardly axially and outwardly radially at a lesser angle with the wheel axis. The rim 42 surmounted by the tire 43 has an inwardly radially extending rib 44 disposed between the planar portions 40. Aligned perforations in the rib 44 and portions 40—40 receive bolts 45 and the portions 40 are clamped against opposite sides of the rib 44.

In this form of my invention, the planar portions 40 engage the rib entirely around the wheel; but at spaced portions, such for example as five portions as illustrated, the discs 41 are provided with outwardly radially extending tongue portions 46 the extreme peripheral portions 47 of which are flared outwardly as shown in Fig. 6 and the rim 42, in the corners thereof as at 48—48 where the rib 44 joins the band shaped rim felly 49, is formed to have an annular rounded outwardly flaring corner or surface substantially conforming to the outwardly flaring portion of the tongue 46. Outwardly beyond the corner 48, the felly 49 has inwardly thereof a generally conical surface portion 50 which is a continuation of the said outwardly flaring corner 48.

In assembling the discs 41 with the rim 42, the tongue portion of the discs may take up a position such as illustrated in Fig. 7 with the portion 40 slightly spaced from the sides of the rim 44 and with the ends 47 of the tongues engaging the conical portion 50 of the rim. Upon tightening the bolts 45, the portions 40 will be drawn flat against the rib 44 and the end 47 of the tongues will move to their final position, Fig. 6, with a wedging action upon the rim, exerting an outward radial thrust thereon, and in their final seated position will rigidly connect together the rim and the discs.

Thus in both of the forms in my invention illustrated in Figs. 1 and 6, load from the shaft is transmitted to the rim along the diagonal braced direction of the concave plates or discs. The thrust from the plates or discs is transferred to the rim through mutually engaging portions that are wedgingly engaged with each other and therefore not subject to looseness after continued use.

In the form of Fig. 1, the bolts 17 have no direct connection with the rim whatever and in the form of Fig. 6, although the bolts 45 extend through the rim 44, clearance may be provided in the perforations in the discs 40 and/or in the rim 44; and thus in both forms Figs. 1 and 6, the outward radial thrust of the discs on the rim and the inwardly axial thrusts of the discs on the rim rib effected by the bolt may be relied upon to provide a rigid permanent wheel assembly.

Preferably, in Fig. 1 the bolts 17 are located radially inwardly from the base engaging peripheral portion 13 and in the form of Fig. 5 the bolts 45 are disposed inwardly radially from the tongs 46.

The mode of illustrating the assembly of Fig. 6 namely the disposition of parts as illustrated in Fig. 7 preparatory to drawing the discs toward each other, may be employed in the assembling of Fig. 1 and, referring to Fig. 5, the base engaging portion 13 may be disposed in the broken line position before the bolts 17—17 are tightened and thus the wedging effect above described may be increased if desired.

My invention as hereinafter claimed is not limited to the exact details of construction shown and described inasmuch as many changes and modifications may be made within the scope and spirit of my invention without sacrificing its advantages.

I claim:

1. In a disc type wheel, a rim having an inwardly radially extending rib portion, a pair of axially dished discs of sheet metal having each a plurality of peripheral circumferentially spaced generally radial outwardly projecting portions engageable with opposite corresponding rim portions, the portions of the discs between each pair of projecting portions being of reduced radius whereby said disc portions are free of contact with the rim, the radially outer ends of the projecting portions being generally beveled, and the rim portions having corresponding wedging surfaces wedgingly engageable by the beveled ends, and securing means for drawing the projecting portions into rigid wedging engagement with the wedging surfaces of the rim portions.

2. In a disc type wheel, a rim having an inwardly radially extending rib portion, a plurality of circumferentially spaced disc-supporting bases on axially opposite sides of the rib, a tongue extending axially from each base, the discs having each corresponding correlative peripheral circumferentially spaced generally radially outwardly projecting portions having peripheral notches therein, the projecting portions being adapted to be seated upon the bases with the tongues in the notches, the discs being formed from sheet metal and the outer radial ends of the projecting portions being generally beveled and the rim bases being provided with flaring wedging surfaces corresponding to the beveled edges and means to draw the discs toward each other to wedgingly engage the beveled edges with the wedging surfaces.

3. In a disc type wheel, a rim having an inwardly radially extending rib portion, a pair of inwardly axially dished discs of sheet metal, the periphery of the discs and the rim having circumferentially spaced cooperating surfaces wedgingly engageable, the portions of the discs and the rim intermediate said circumferentially spaced engageable surfaces being spaced apart, and securing means for drawing the discs together with the circumferentially spaced surfaces of the rim and the discs in rigid wedging engagement.

4. In a disc type wheel, a rim having an inwardly radially extending rib portion, a pair of inwardly axially dished discs of sheet metal, the disc peripheries, and the rim having circumferentially spaced cooperating surfaces wedgingly engageable, the portions of the discs and the rim intermediate said circumferentially spaced engageable surfaces being spaced apart, the engageable portions of said rim and said discs having mutually interlocking projection and recess means preventing rotative movement of the discs and the rim relative to each other, and securing means for drawing the discs together with the circumferentially spaced surfaces of the rim and the discs in rigid wedging engagement.

5. In a disc type wheel, a rim having a radially extending rib portion, a plurality of circumferentially spaced disc supporting bases, on opposite sides of the rib, the bases having radially outwardly flaring wedging surfaces, the discs each having corresponding cooperative peripheral circumferentially spaced generally radially outwardly projecting portions, the projecting portions being adapted to be seated upon the bases, said bases and said projecting portions having mutually interlocking projection and recess means preventing rotative movement of the discs and the rim relative to each other, the discs being formed of sheet metal, the outer radial ends of the projecting portions engaging the bases on the rim, and means to draw the discs into rigid wedging engagement with the wedging surfaces on the rim.

6. In a disc type wheel, a rim having an inwardly radially extending rib portion, a pair of outwardly axially dished discs of sheet metal, the peripheries of the discs and the rim having circumferentially spaced cooperating surfaces wedgingly engageable, the portions of the discs and the rim intermediate said circumferentially spaced engageable surfaces being spaced apart, securing means for drawing the discs together with the circumferentially spaced surfaces of the rim and the discs in rigid wedging engagement, and mutually interlocking means on the rim and discs preventing relative rotative movement.

CHAUNCEY W. GANNETT.